United States Patent
Taniguchi et al.

(10) Patent No.: US 8,109,673 B2
(45) Date of Patent: Feb. 7, 2012

(54) SLIDE GUIDE APPARATUS OF PRESS MACHINE

(75) Inventors: Naonori Taniguchi, Sagamihara (JP); Masakatsu Shiga, Sagamihara (JP)

(73) Assignee: Aida Engineering, Ltd., Sagamihara (JP)

( * ) Notice: Subject to any disclaimer, the term of this patent is extended or adjusted under 35 U.S.C. 154(b) by 505 days.

(21) Appl. No.: 12/364,337

(22) Filed: Feb. 2, 2009

(65) Prior Publication Data

US 2009/0208150 A1 Aug. 20, 2009

(30) Foreign Application Priority Data

Feb. 20, 2008 (JP) .................................. 2008-38619

(51) Int. Cl.
*F16C 29/02* (2006.01)
(52) U.S. Cl. .......................................... 384/38; 384/42
(58) Field of Classification Search .................. 384/7, 11, 384/13, 26, 35, 38–42
See application file for complete search history.

(56) References Cited

U.S. PATENT DOCUMENTS

| 3,719,404 A * | 3/1973 | Sterner ........................... 384/38 |
| 6,524,092 B1 * | 2/2003 | Ito et al. ......................... 384/38 |
| 7,013,800 B2 * | 3/2006 | Kanamaru et al. ............. 384/38 |
| 2002/0061144 A1 * | 5/2002 | Kanamaru et al. ............. 384/26 |

FOREIGN PATENT DOCUMENTS

| DE | 44 01 507 A1 | 8/1995 |
| DE | 195 43 519 A1 | 5/1997 |
| EP | 1354697 A1 | 10/2003 |
| JP | 56-45599 U | 4/1981 |
| JP | 2002-11600 A | 1/2002 |
| JP | 2002-59298 A | 2/2002 |
| JP | 2003-311495 A | 11/2003 |

* cited by examiner

*Primary Examiner* — Thomas R Hannon
(74) *Attorney, Agent, or Firm* — McDermott Will & Emery LLP

(57) ABSTRACT

A slide guide apparatus of a press machine, which guides reciprocating motion of a slide of the press machine by a sliding surface provided between a guide member and the slide, wherein a slide member that is rotatable about a predetermined rotation center axis and a slide member holder that rotatably holds the slide member and is rotatable about a rotation center axis transverse to the predetermined rotation center axis are provided between the guide member and the slide, and a flat portion of the slide member is adapted to function as the sliding surface.

17 Claims, 6 Drawing Sheets

SLIDE GUIDE APPARATUS OF PRESS MACHINE

CROSS-REFERENCE TO RELATED APPLICATION

The present application claims priority from Japanese Patent Application No. 2008-38619, filed on Feb. 20, 2008, which is hereby incorporated by reference in its entirety.

FIELD OF THE INVENTION

The present invention relates to a slide guide apparatus of a press machine for guiding a slide of the press machine that performs press working utilizing reciprocating motion of the slide.

BACKGROUND

A slide guide apparatus of this type is described in, for example, Japanese Patent Application Laid-Open No. 2003-311495 (which will be hereinafter referred to as patent document 1). In this apparatus, convex spherical portions and concave spherical portions cooperating with the convex spherical portions are provided between a slide and the main body of the press machine, whereby relative tilt between the slide and the main body of the press machine is prevented or absorbed. Thus, surface contact of the sliding surface is ensured, and the surface pressure of the sliding surface is made uniform, whereby abrasion and adhesion caused by heat fusion due to friction can be prevented, and reciprocating motion of the slide can be guided with low friction with a high degree of precision.

More specifically, as shown in FIGS. 1 to 11 of patent document 1, in the slide guide apparatus described in patent document 1, thanks to position adjustment achieved by convex spherical portions of spherical members and concave spherical portions of holders or caps that cooperate with the convex spherical portions, surface contact of flat portions of the spherical members or flat portions of the caps and flat portions of gibs provided on a frame of the press machine that face the flat portions of the spherical members or the flat portions of the caps is always maintained as they slide, whereby up and down motion of the slide is guided. In this slide guide apparatus, the spherical members or the holders are attached to the slide by their flat portions. Thus, complicated spherical surface machining with a high degree of precision on the slide can be eliminated, and machining of the slide is made easy.

Japanese Patent Application Laid-Open No. 2002-11600 (which will be hereinafter referred to as patent document 2) describes a slide guide apparatus in which a slide of a press machine is provided with spherical blocks or cylindrical blocks each having an L-shaped guide surface (constituted by surfaces arranged in an L-shape) for receiving a part of the frame of the press machine, and sliding of the aforementioned L-shaped guide surfaces and guide surfaces provided on the frame of the press machine is enabled with surface contact being always maintained by the effect of the spherical surface of the spherical blocks or the cylindrical surfaces of the cylindrical blocks.

Japanese Patent Application Laid-Open No. 2002-59298 (which will be hereinafter referred to as patent document 3) also discloses a slide guide apparatus in which slide gibs are provided on a slide. The slide gib has an L-shaped sliding surface that slides on a guide surface of a fixed gib provided on a column and a cylindrical portion that is inserted along the front-rear direction of the slide and rotatable relative to the slide to enable a sliding surface of the slide gib and a sliding surface of the fixed gib to slide with surface contact being always maintained.

The apparatus described in patent document 1 can prevent partial contact of sliding surfaces of a guide surface (e.g. a flat portion of the spherical member) on the slide of the slide guide apparatus and a guide surface extending along the sliding direction on a gib on the frame to achieve uniform contact over the entire sliding surfaces.

However, if the surface pressure of the sliding surfaces is required to be made small even when a relatively heavy eccentric load acts on the slide to generate a strong rotational force, the contact area of the guide surface (i.e. the flat portion of the spherical member) on the slide and the guide surface extending on the gib on the frame needs to be made large. However, enlargement of the contact area (or sliding area) of the guide surface (i.e. the flat portion of the spherical member) on the slide necessitates enlargement of the diameter of the spherical member having a spherical shape, which may possibly lead to restriction of mounting space of the spherical member on the slide or other problems. In addition, enlargement of the diameter of the spherical member requires enlargement of the width of the guide surface extending on the gib on the frame. As a result, the slide guide apparatus as a whole will require a large space.

On the other hand, in a case where the flat portion of the cap constitutes the guide surface that is in contact with and slides on the guide surface on the gib on the frame, the flat portion may be configured to have a rectangular shape that is elongated in the sliding direction in order to enlarge the contact area. However, in this case also, the pressure-receiving surface on the back side of the flat portion of the cap is spherical, and therefore, on the back side of the rectangular flat portion (or sliding surface) of the cap are a portion in which the spherical pressure receiving surface that engages with the spherical member is present and a portion in which the spherical pressure receiving surface is not present (i.e. a portion away from the spherical pressure receiving surface) along the sliding direction. Thus, the portion in which the pressure receiving surface is not present on the back side has a lower rigidity than the portion in which the spherical pressure receiving surface is present and deforms more easily by a load. Therefore, the surface pressure of the portion of the sliding surface in which the pressure receiving surface is not present on the back side will become lower.

For the above reason, even in a case where the flat portion of the cap has a rectangular shape, if the force acting on the slide guide is strong, the force cannot be distributed uniformly over the entire guide surface (or sliding surface), but the surface pressure in the portion in which the pressure receiving surface that engages with the spherical member present becomes high. Therefore, even when the guide surface of the cap is configured to have a rectangular shape elongated in the sliding direction, a great effect cannot be expected.

In the apparatuses described in patent documents 2 and 3, a plurality of intersecting guide surfaces are provided on the frame, and a cylindrical block (or slide gib) having a plurality of guide surfaces (having, for example, an L-shape) cooperating with the guide surfaces on the frame is fitted in the slide. This apparatus is intended to always maintain surface contact of a guide surface on the frame and a guide surface of a cylindrical block (or slide gib) fitted in the slide without partial contact as they slide, by virtue of the operation of the cylindrical surface of the cylindrical block (or slide gib) (i.e. rotation along the cylindrical surface or rotation about the center of the cylinder). However, even in a case where the guide surfaces (having, for example, an L-shape) provided on the cylindrical block (or slide gib) are flat surfaces parallel to the center of the cylindrical surface, rotation of the cylindrical block (or slide gib) along the cylindrical surface is not contributive to surface contact of the guide surfaces, unless the guide surfaces on the frame are flat surfaces parallel to the cylinder center of the cylindrical block (or slide gib). Therefore, there is a possibility that a significant degree of partial contact occurs depending on the situation, for example in a case where the load acting on the slide is heavy and/or eccentric.

In order to achieve surface contact of the guide surfaces (having, for example, an L-shape) on the cylindrical block (or slide gib) and the respective corresponding guide surfaces on the frame, it is necessary that the angle formed by the guide surfaces (having, for example, an L-shape) on the cylindrical block (or slide gib) and the angle formed by the corresponding guide surfaces on the frame be made equal to each other. However, neither the cylindrical block (or slide gib) nor the frame is provided with means for adjusting the angle of their guide surfaces, and therefore the degree of accuracy of the angle formed by the guide surfaces depends on the degree of precision in machining and assembling during manufacturing of the cylindrical block (or slide gib) and the frame.

Since there is a limit to the degree of precision in machining and assembling, it is difficult, as a matter of fact, to manufacture a slide guide apparatus in such a way that it can achieve simultaneous surface contact of the guide surfaces intersecting at a certain angle with an uniform surface pressure.

Even when the guide surfaces of the cylindrical block (or slide gib) intersecting at a predetermined angle are in surface contact with the respective corresponding guide surfaces on the frame, if a large moment acts on the slide due to an eccentric press load, the guide surfaces (which are arranged to form a predetermined angle) of the cylindrical block (or slide gib) that receives the moment will be pressed against the guide surfaces on the frame, whereby the predetermined angle formed by the intersecting guide surfaces may be enlarged. Thus, there is a possibility that uniformity in the surface pressure cannot be maintained.

SUMMARY OF THE INVENTION

The present invention has been made in view of the above described situations and has as an object to provide a slide guide apparatus of a press machine in which the surface pressure on a sliding surface between a slide and a guide member or the main body of the press machine is made uniform by reliably maintaining surface contact of the sliding surface with a simple structure that can be produced easily, whereby abrasion and adhesion caused by heat fusion due to friction can be prevented from occurring, and reciprocating motion of the slide relative to the main body of the press machine can be guided with low friction with a high degree of precision.

To achieve the above object, according to the present invention, there is provided a slide guide apparatus of a press machine, which guides reciprocating motion of a slide of the press machine by a sliding surface provided between a guide member and the slide, wherein a slide member that is rotatable about a predetermined rotation center axis and a slide member holder that rotatably holds the slide member and is rotatable about a rotation center axis transverse to the predetermined rotation center axis are provided between the guide member and the slide, and a flat portion of the slide member is adapted to function as the sliding surface.

In the slide guide apparatus according to the present invention, the slide member may have a cylindrical portion having a cylindrical outer surface provided about the predetermined rotation center axis and the flat portion extending along the direction of the predetermined rotation center axis, and the slide member holder may have a cylindrical portion having a cylindrical outer surface provided about the rotation center axis transverse to the predetermined rotation center axis and rotatably receive the cylindrical portion of the slide member in a recess.

In the apparatus according to the present invention, the slide member and the slide member holder may be retained on the slide.

In the apparatus according to the present invention, the cylindrical portion of the slide member may be provided with a stepped portion stepped with respect to the radial direction, the recess of the slide member holder may be provided with a stepped portion engaging with the stepped portion of the slide member, and positioning of the slide member with respect to the direction of the predetermined rotation center axis relative to the slide member holder may be achieved by means of engagement of the stepped portions.

In the apparatus according to the present invention, in a case where the slide has a substantially rectangular shape in a plane substantially perpendicular to the direction of reciprocating motion, slide members similar to the slide member and slide member holders similar to the slide member holder may be provided at or in the vicinity of four corners of the slide.

In this case, adjacent sliding surfaces may be arranged in such a way that if the adjacent sliding surface are extended toward inside of the slide, the extensions thereof intersect with each other as seen from the direction of reciprocating motion. When the sliding surfaces are arranged in this way, even if the slide expands for example with a temperature rise (or contracts with a temperature fall), the slide will deform along the sliding surfaces. Therefore, surface contact of the sliding surfaces can be maintained, and reciprocating motion of the slide can be guided with low friction with a high degree of precision without abrasion or adhesion caused by heat fusion due to friction.

Alternatively, adjacent sliding surfaces may be arranged in such a way that if the adjacent sliding surface are extended toward outside of the slide, the extensions thereof intersect with each other as seen from the direction of reciprocating motion.

The direction of the predetermined rotation center axis may be arranged to be substantially parallel to the direction of reciprocating motion of the slide. In this case, the area of the sliding surface can be increased by extending the flat portion (or sliding surface) of the slide member along the direction of reciprocating motion of the slide, whereby the surface pressure on the sliding surface can easily be reduced.

In a case where a cylindrical portion that functions as a pressure receiving surface is provided behind the flat portion serving as a sliding surface, extending the flat portion (sliding surface) along the direction of reciprocating motion of the slide necessitates extension of the cylindrical portion along the direction of reciprocating motion of the slide (i.e. along the direction of center axis of the cylinder). In this case, the entire area behind the flat portion (sliding surface) can serve as the pressure receiving surface. Therefore, the area of both the sliding surface and the pressure receiving surface can be made larger by a compact structure as compared to the structure using a spherical shape or the like as described in patent document 1. Thus, the surface pressure on the pressure receiving surface can be decreased uniformly, and the surface pressure on the flat portion (sliding surface) can also be decreased uniformly.

According to the present invention, there can be provided a slide guide apparatus of a press machine in which the surface pressure on a sliding surface between a slide and a guide member or the main body of the press machine is made uniform by reliably maintaining surface contact of the sliding surface with a simple structure that can be produced easily, whereby abrasion and adhesion caused by heat fusion due to friction can be prevented from occurring, and reciprocating motion of the slide relative to the press machine can be guided with low friction with a high degree of precision.

In a case where a cylindrical portion that functions as a pressure receiving surface is provided behind the flat portion serving as a sliding surface, extending the flat portion (sliding surface) along the direction of reciprocating motion of the slide necessitates extension of the cylindrical portion along the direction of reciprocating motion of the slide (i.e. along the direction of center axis of the cylinder). In this case, the entire area behind the flat portion (sliding surface) can serve as the pressure receiving surface. Therefore, the area of both the sliding surface and the pressure receiving surface can be made larger by a compact structure as compared to the structure using a spherical shape or the like as described in patent document 1. Thus, the surface pressure on the pressure receiving surface can be decreased uniformly, and the surface pressure on the flat portion (sliding surface) can also be decreased uniformly.

DESCRIPTION OF THE PREFERRED EMBODIMENTS

In the following, an embodiment of the slide guide apparatus of a press machine according to the present invention will be described by way of example with reference to the accompanying drawings. It should be understood, however, that the embodiment described in the following is not intended to limit the present invention.

Figure 1:
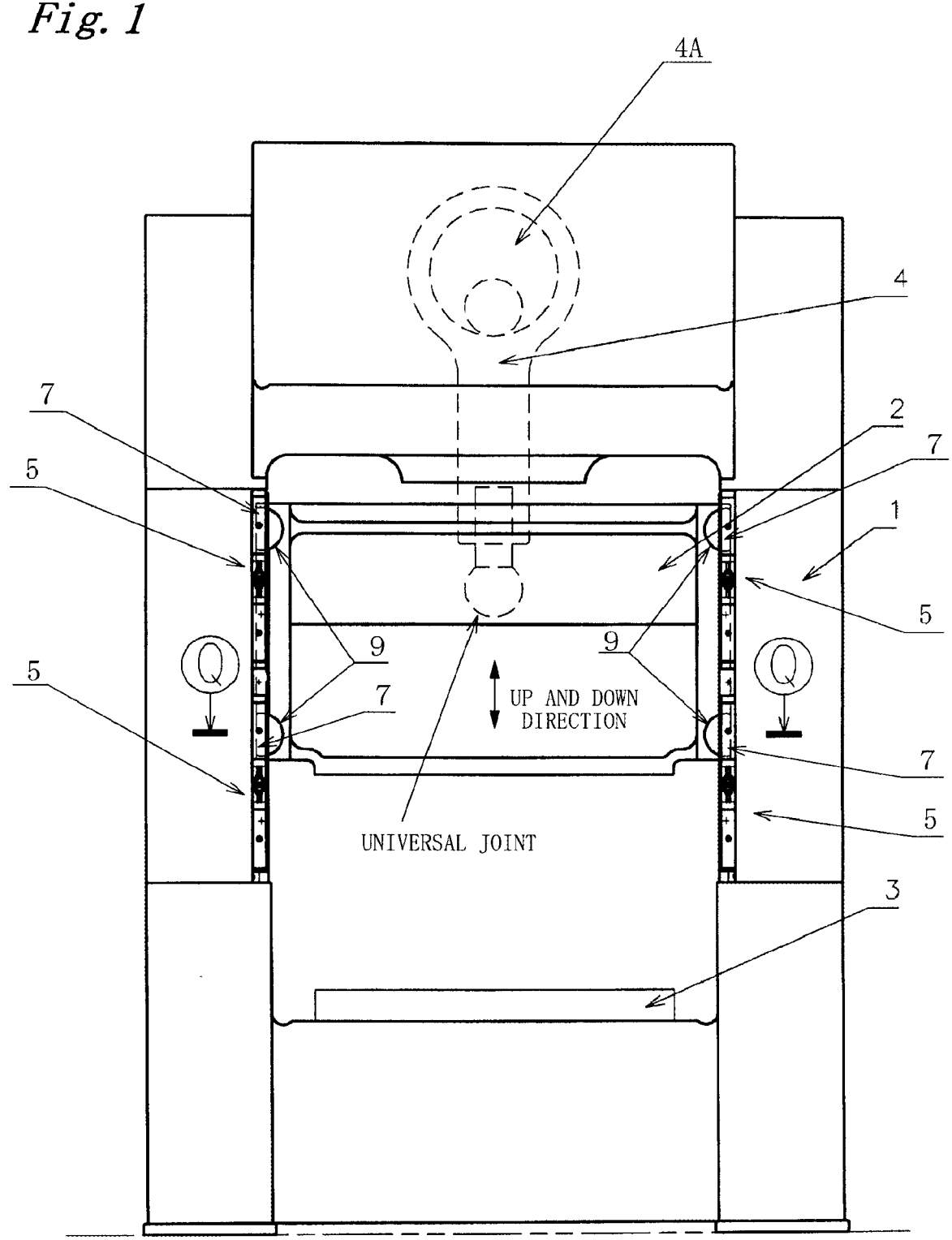
FIG. 1 is a front view showing the entire structure of a press machine according to an embodiment of the present invention.

FIG. 1 is a front view of a press machine in which only the portions relevant to this embodiment are illustrated. A bolster 3 is fixedly mounted on the bed portion of the frame 1 of the press machine. A slide 2 is provided in such a way as to be opposed to the bolster 3 and capable of moving up and down.

The slide 2 is connected with a connecting rod 4 via a universal joint or the like. The slide 2 is moved up and down by a crank mechanism composed of a crankshaft 4A and the connecting rod 4, whereby press working is performed by a die attached on the bottom of the slide 2.

Figure 2:
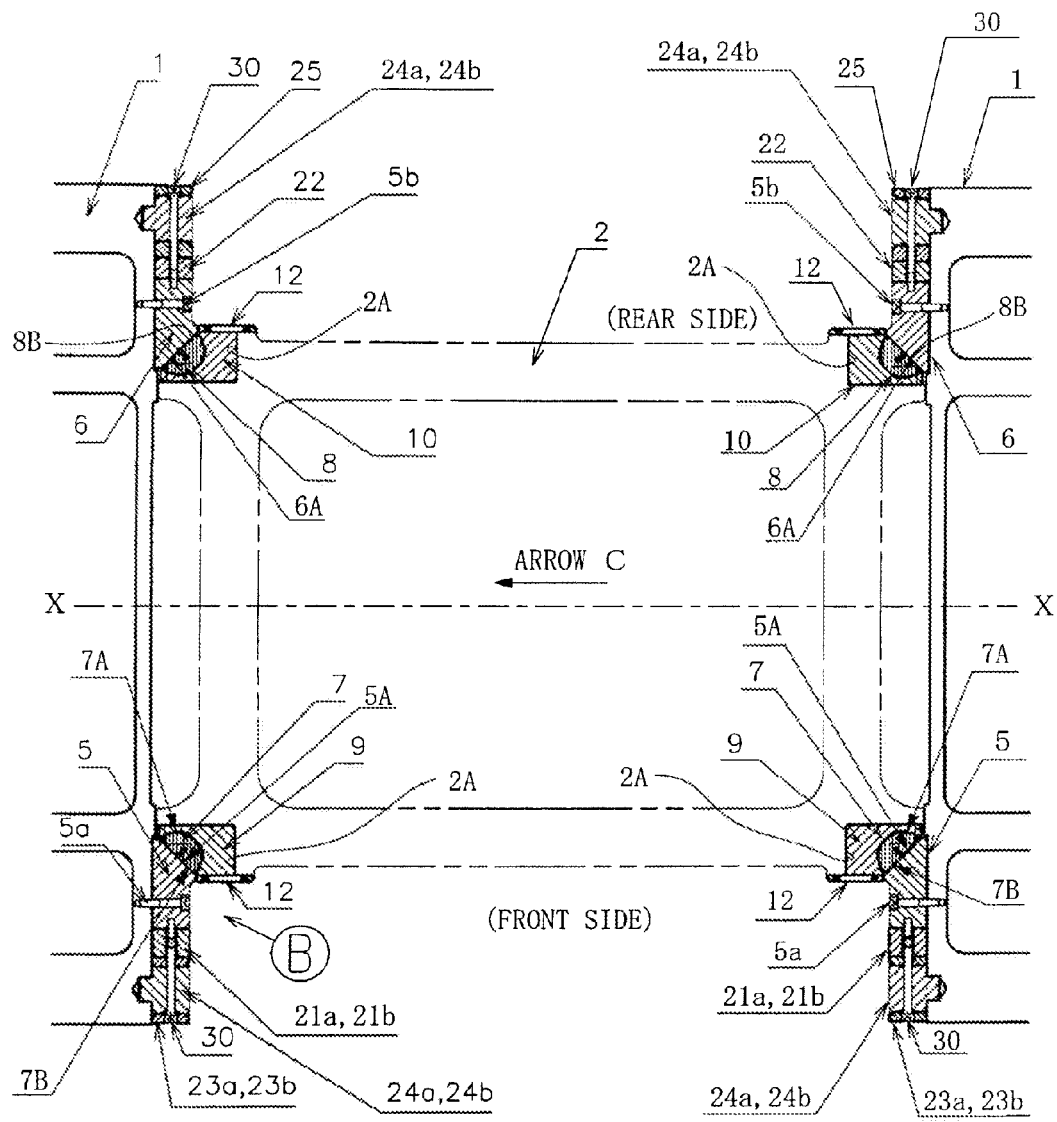
FIG. 2 is a cross sectional view taken along line Q-Q in FIG. 1 showing a slide guide apparatus of the press machine according to the embodiment

As shown in FIG. 1, inside each of the left and right column portions of the frame 1 is provided a pair of gibs 5, 5 (or a two-part gib) (see FIG. 4) that extends along the up and down direction of the slide 2 with a certain space therebetween. As shown in FIG. 2, on the rear side of the press machine is another pair of gibs 6, 6 (see FIG. 4) that is opposed to the pair of gibs 5, 5.

Sliding surfaces (or guide surfaces) 5A, 5A of the gibs 5, 5 that function as guide members are located in a plane that forms a certain angle with the surface of the column portion of the frame 1 that faces the slide. Similarly, sliding surfaces (or guide surfaces) 6A, 6A of the gibs 6, 6 that function as guide members are located at a position that is plane-symmetrical to the sliding surfaces (or guide surfaces) 5A, 5A with respect to a center plane X-X of the slide 2 that is substantially perpendicular to the plane of FIG. 2.

Up and down motion of the slide 2 is guided by these four sliding surfaces 5A, 6A along the up and down direction with play of the slide 2 within the plane of FIG. 2 being restricted.

FIG. 2 is a cross sectional view taken along line Q-Q in FIG. 1. As shown in FIG. 2, at the four corners of the slide 2, sliding member holders 9, 10 that rotatably hold semi-cylindrical slide members 7, 8 that are in surface contact with the sliding surfaces (or guide surfaces) 5A, 6A of the gibs 5, 6 are rotatably supported on the slide 2.

More specifically, the sliding member holder 9, 10 has a semi-cylindrical shape, namely a section of a cylinder cut by a plane substantially parallel to the center axis of the cylinder, which has a semicircular outer shape. Thus, the slide member holder 9, 10 is rotatable relative to the slide 2 by means of the semicircular portion, about a rotation center axis that is substantially parallel to the plane of FIGS. 2 and 3A (or the rotation center axis that is substantially perpendicular to the up and down direction of the slide 2). The apparatus is also provided with a retainer plate 12 that retains the slide member holder 9, 10 in a semi-cylindrical recess 2A of the slide 2.

Figure 3A:
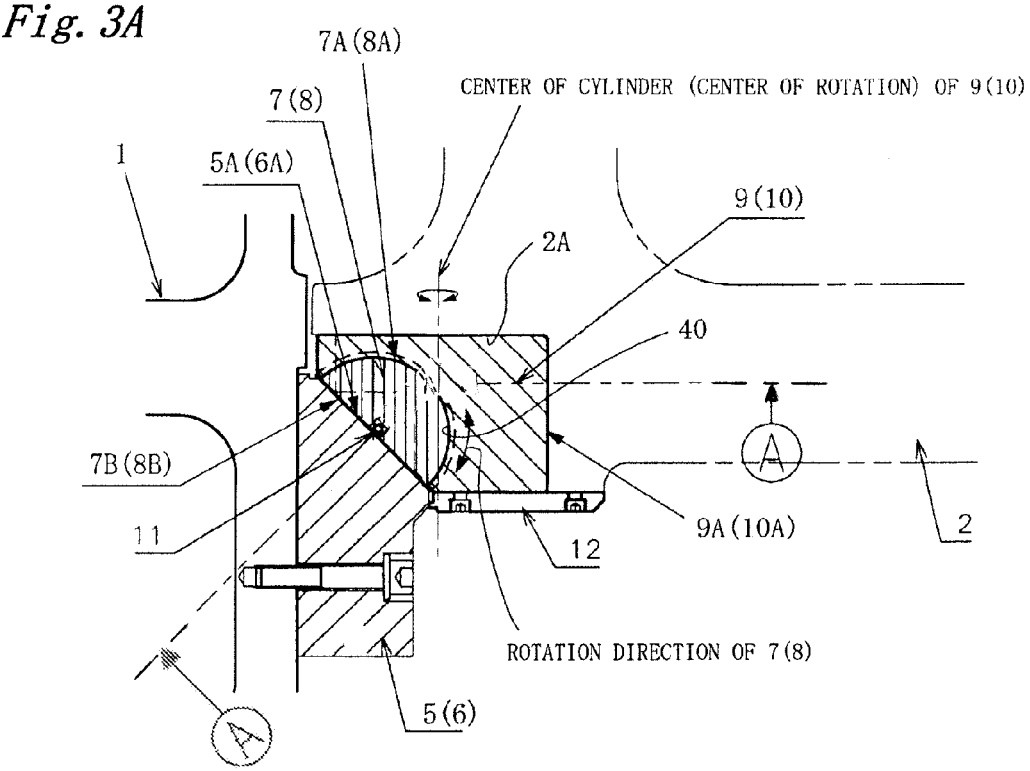
FIG. 3A is an enlarged view showing portion B in FIG. 2.
Figure 3B:
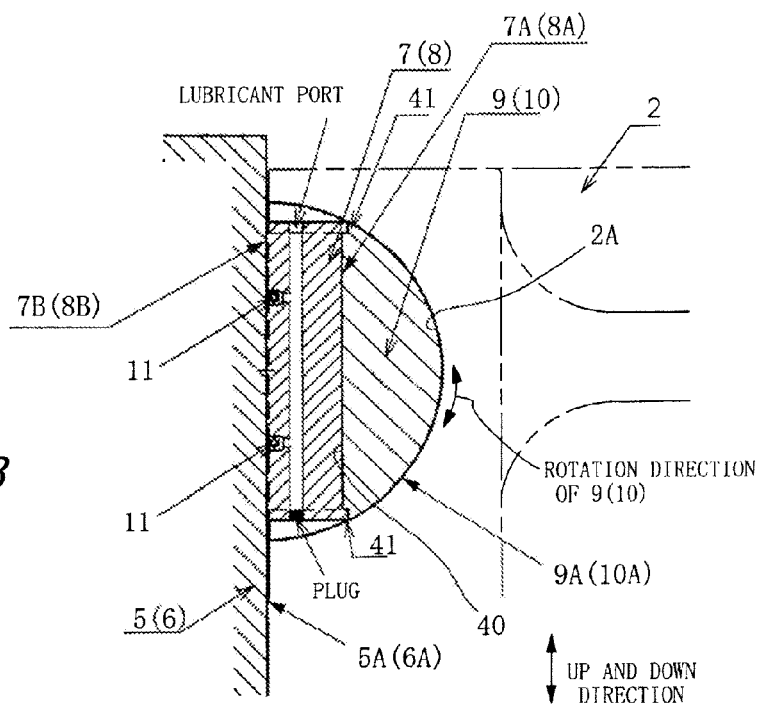
FIG. 3B is a cross sectional view taken along line A-A in FIG. 3A.

As shown in a cross sectional view of FIG. 3B taken along line A-A in FIG. 3A, the slide member holder 9 (10) is rotatably received in (or engages with) the semi-cylindrical recess 2A formed on the slide 2 in such a way that the semi-circular outer surface 9A (10A) of the slide member holder 9 (10) is in surface contact with and slides on the inner surface of the semi-cylindrical recess 2A.

The semi-cylindrical slide member 7 (8) has a semi-cylindrical shape, namely a section of a cylinder cut by a plane substantially parallel to the center axis of the cylinder, which has a semicircular outer shape. Thus, the slide member 7 (8) is rotatable relative to the slide member holder 9 (10) by means of the semicircular portion, about a rotation center axis that is substantially perpendicular to the plane of FIGS. 2 and 3A (or the rotation center axis that is substantially parallel to the up and down direction of the slide 2).

As shown in FIG. 3A, the semi-cylindrical slide member 7 (8) is rotatably received in (or engages with) a semi-cylindrical recess 40 formed on the slide member holder 9 (10) in such a way that the semi-circular outer surface 7A (8A) of the semi-cylindrical slide member 7 (8) is in surface contact with and slides on the inner surface of the semi-cylindrical recess 40.

As shown in FIG. 3B, the recess 40 is provided with stepped portions 41 that engage with stepped portions provided at both ends of the semi-cylindrical slide member 7 (8). Positioning of the semi-cylindrical slide member 7 (8) relative to the slide member holder 9 (10) with respect to the direction of the rotation center axis of the semi-cylindrical slide member 7 (8) is achieved by these stepped portions 41. Therefore, even in a case both the end portions of the recess 40 having a semi-cylindrical inner surface provided on the slide member holder 9 (10) are configured to be open to facilitate machining of the inner surface of the recess 40, play of the semi-cylindrical slide member 7 (8) with respect to the rotation center axis direction can be prevented with reliability. The positions at which the stepped portions 41 are provided are not limited to the end portions of the recess 40, as long as play of the semi-cylindrical slide member 7 (8) is prevented and the stepped portions are easily produced. For example, one or a plurality of stepped portions may be provided at the substantially center portion of the semi-cylindrical slide member 7 (8) with respect to the rotation center axis direction, and one or a plurality of stepped portions that engage therewith may be provided on the slide member holder 9 (10). Such a stepped portion(s) provided on the slide member holder 9 (10) may be either a projection(s) or a recess(es).

As shown in FIGS. 2, 3A and 3B etc, the flat portion (or sliding surface) 7B (8B) of the semi-cylindrical slide member 7 (8) formed by cutting a cylinder by a plane substantially parallel to the center axis of the cylinder is arranged to be in contact with the sliding surface (or guide surface) 5A (6A) of the gib 5 (6). These surfaces are in surface contact with each other to allow sliding, whereby up and down movement of the slide 2 is guided.

As described above, in this embodiment, the slide member holder 9 (10) that can rotate or turn about a rotation center axis that is substantially perpendicular to the plane of FIG. 3B is used. Thanks to this feature, even if the direction of up and down movement of the slide 2 and the sliding surface (or guide surface) 5A (6A) of the gib 5 (6) are inclined or tilted relative to each other in the plane of FIG. 1 (or FIG. 3B), such an inclination or tilt is absorbed, and good surface contact of the outer surface 7A (8A) of the semi-cylindrical slide member 7 (8) and the sliding surface (or guide surface) 5A (6A) of the gib 5 (6) can be achieved.

Furthermore, in this embodiment, the semi-cylindrical slide member 7 (8) is retained in such a way as to be rotatable relative to the slide member holder 9 (10) about a rotation center axis that is substantially parallel to the plane of FIG. 3B. Thanks to this feature, even if the direction of up and down movement of the slide 2 and the sliding surface (or guide surface) 5A (6A) of the gib 5 (6) are inclined or tilted relative to each other in the direction perpendicular to the plane of FIG. 1 (or FIG. 3B), such an inclination or tilt is absorbed, and good surface contact of the outer surface 7A (8A) of the semi-cylindrical slide member 7 (8) and the sliding surface (or guide surface) 5A (6A) of the gib 5 (6) can be achieved.

Thus, the semi-cylindrical slide member 7 (8) is rotatable relative to the sliding surface (guide surface) 5A (6A) of the gib 5 (6), and therefore even if the slide 2 tends to be tilted to some extent by, for example, an eccentric load, tilting can be prevented, and surface contact of the sliding surface 7B (8B) of the semi-cylindrical slide member 7 (8) and the sliding surface (or guide surface) 5A (6A) of the gibe 5 (6) can be maintained excellently during sliding. Therefore, highly precise reciprocating motion of the slide 2 is achieved, and partial contact such as linear contact of the sliding surfaces is prevented. Thus, abnormal abrasion and adhesion caused by heat fusion due to friction of the sliding surfaces (or guide surface) will be prevented from occurring with reliability.

Each of the semi-cylindrical slide members 7, 8 and the slide member holders 9, 10 used in this embodiment is prepared using a portion of a cylinder. Therefore, they can be produced more easily than slide members and slide member holders that utilizes spherical shapes, and the manufacturing cost can be made lower.

As per the above, in the slide guide apparatus provided with the semi-cylindrical slide members 7, 8 and the slide member holders 9, 10 according to this embodiment, surface contact of the sliding surfaces can be always maintained without occurrence of partial contact such as linear contact, in spite of its simple structure that can be easily produced. Therefore, the surface pressure on the sliding surfaces can be made uniform, whereby abrasion and adhesion caused by heat fusion due to friction can be prevented, and reciprocating motion of the slide 2 relative to the main body of the press machine can be guided with low friction with a high degree of precision.

If the apparatus according to this embodiment is adapted for use at a high surface pressure, the surface pressure can easily be maintained at a prescribed level by making the length of the sliding surface along the sliding direction larger, without inviting any disadvantage such as the problem of mounting space or unevenness in the surface pressure, which the apparatus utilizing a spherical surface suffers from as described before.

In the embodiment describe above, the slide member holders 9, 10 are provided in such a way as to be rotatable about the respective rotation axes that are substantially perpendicular to the direction of up and down movement of the slide 2, the semi-cylindrical slide members 7, 8 are provided in such a way as to be rotatable about the respective rotation axes that are substantially parallel to the direction of up and down movement of the slide 2, and accordingly the rotation center axes of the slide member holders 9, 10 and the rotation center axes of the semi-cylindrical slide members 7, 8 are substantially perpendicular to each other. However, the present invention is not limited to this particular structure. The axes of rotation of the slide member holders 9, 10 and the axes of rotation of the semi-cylindrical slide members 7, 8 may be arranged to form a predetermined angle so as to achieve surface contact of the sliding surfaces within an adjustment range that meets requirements.

Figure 4:
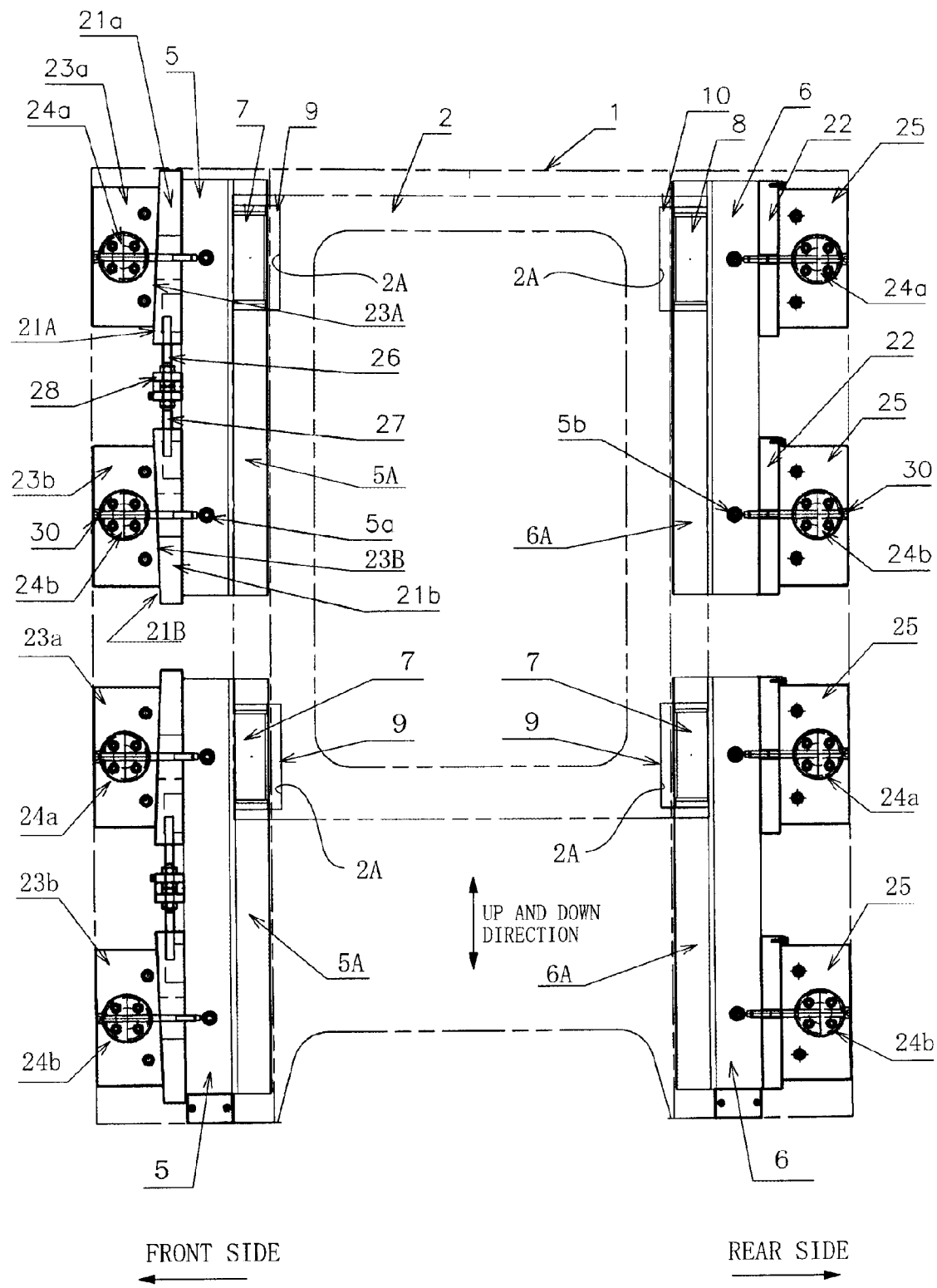
FIG. 4 is a view as seen in the direction indicated by arrow C in FIG. 2.

As shown in FIGS. 2 and 4, the gib 6 that defines the datum position of the guide way is mounted on the column portion of the frame 1 by a block 25 with a spacer 22 therebetween. The block 25 is mounted on the column portion of the frame 1 by means of a pin member 24a (24b).

On the other hand, the gib 5 that serves as a position adjuster is mounted on the column portion of the frame 1 by a support 23a (23b) with a wedge 21a (21b) having a tapered surface 21A (21B) therebetween. The support 23a (23b) is mounted on the column portion of the frame 1 by means of a pin member 24a (24b).

In order to allow appropriate up and down motion of the slide 2 and to achieve sliding of the sliding surfaces 7B, 8B of the semi-cylindrical slide members 7, 8 and the sliding surfaces 5A, 6A of the gibs 5, 6 with good surface contact, the wedge 21a (21b) is displaced in the vertical direction in FIG. 4 (i.e. in the direction of the up and down movement of the slide 2) relative to the support 23a (23b) by turning an adjustment screw 26 (27) screwed in a fixed block 28 fixedly attached on the gib 5 as desired, whereby relative portion of the tapered surface 21A (21B) provided on the wedge 21a (21b) with respect to a tapered surface 23A (23B) provided on the support 23a (23b) opposed thereto is changed. Thus, the position of the gib 5 and its sliding surface 5A is adjusted.

After completion of the above described position adjustment, the gibs 5, 6 are locked on the column portions of the frame 1 by fixing screws 5a, 5b, 30. Thus, the adjustment operation is completed.

If there is a gap between the sliding surfaces 7B, 8B of the semi-cylindrical slide members 7, 8 and the sliding surfaces 5A, 6A of the gibs 5, 6, there is a possibility that the highly precise guiding is deteriorated. In view of this, the gibs 5, 6 may be pressed against the semi-cylindrical slide members 7, 8 by adjusting the positions of the wedges 21a, 21b thereby applying a preload on the sliding surfaces. Furthermore, as shown in FIG. 3, lubricant oil may be supplied as appropriate to the sliding surface through a lubricant passage provided with a check valve 11 or the like. The check valve 11 may be eliminated.

Figure 5:
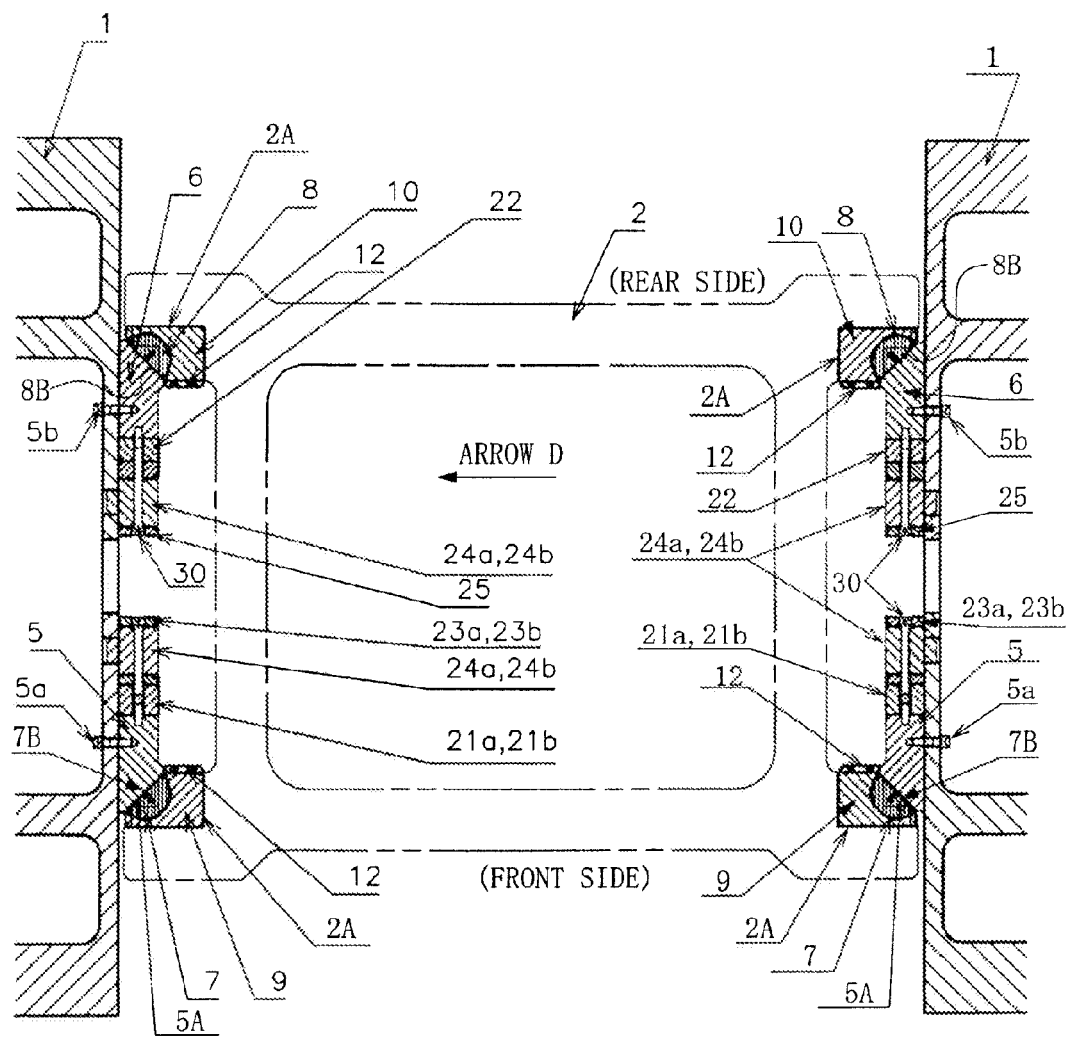
FIG. 5 is a cross sectional view taken along line Q-Q in FIG. 1, showing another slide guide apparatus of the press machine according to the embodiment.

In the above described embodiment, as shown in FIG. 2, the sliding surfaces 7B, 8B of the semi-cylindrical slide members 7, 8 and the sliding surfaces 5A, 6A of the gibs 5, 6 are provided on the outer sides of the corner portions of the slide 2 (in other words, the adjacent sliding surfaces 7B, 8B are arranged in such a way that extensions of the adjacent sliding surfaces 7B and 7B or 7B and 8B intersect at a location outside the slide 2). However, the present invention is not limited to this particular structure. As shown in FIG. 5, the sliding surfaces 7B, 8B of the semi-cylindrical slide members 7, 8 and the sliding surfaces 5A, 6A of the gibs 5, 6 may be provided on the inner sides of the corner portions of the slide 2 (in other words, the adjacent sliding surfaces 7B, 8B may be arranged in such a way that extensions of the adjacent sliding surfaces 7B and 7B or 7B and 8B intersect at a location inside the slide 4).

Figure 6:
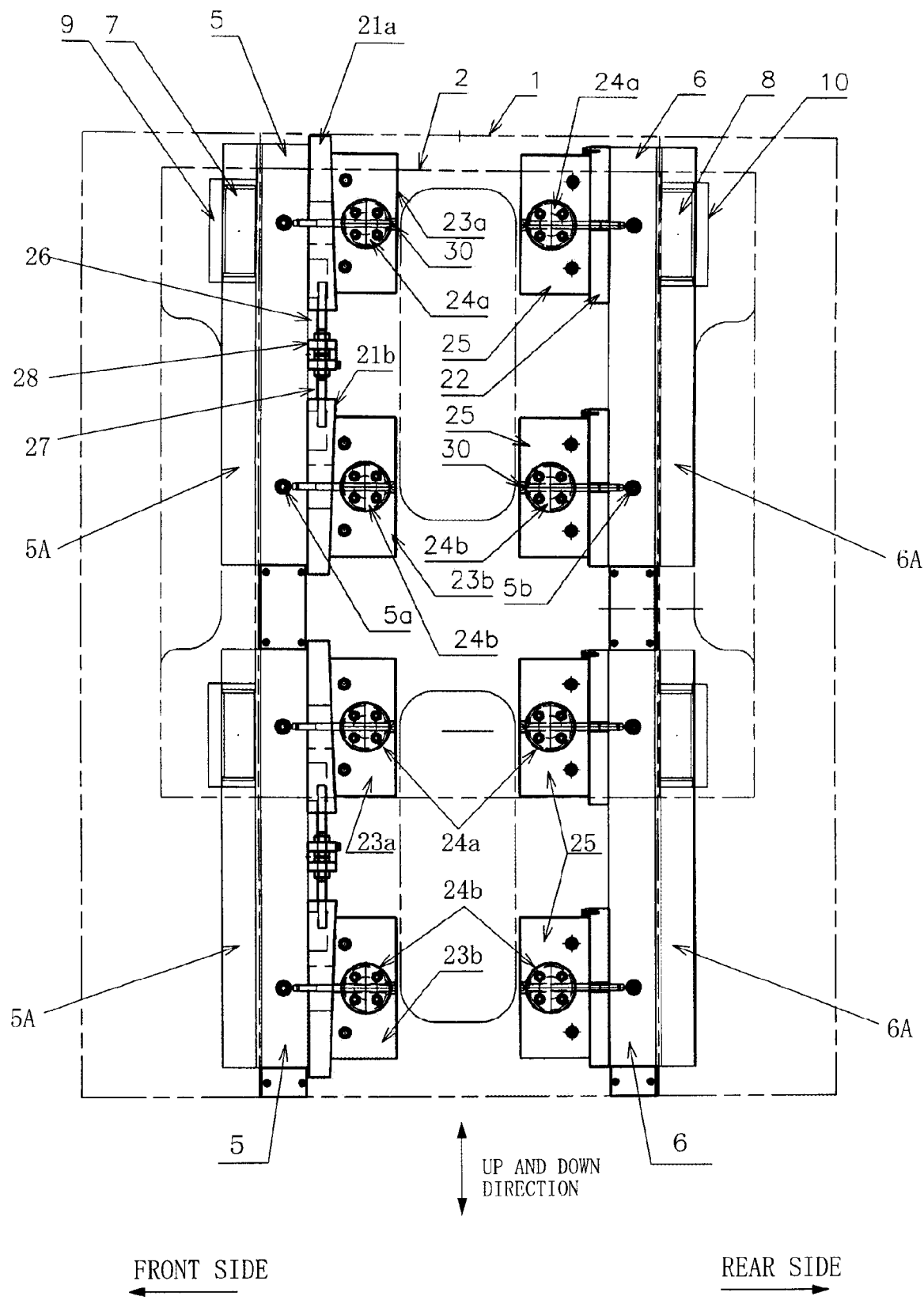
FIG. 6 is a view as seen in the direction indicated by arrow D in FIG. 5.

In the case shown in FIG. 5, the wedges 21a (21b), the spacers 22, the supports 23a (23b), the pin members 24a (24b) and the blocks 25 etc. are provided on the inner side of the corner portions of the slide 2, as shown in FIG. 6. Operations associated with this arrangement such as the position adjustment operation are same as those having been described with reference to FIG. 4 etc, and therefore they will not be described in further detail.

In the case where the sliding surfaces 7B, 8B of the semi-cylindrical slide members 7, 8 and the sliding surfaces 5A, 6A of the gibs 5, 6 are provided on the inner side of the corner portions of the slide 2 as shown in FIG. 5, even if the slide 2 expands with a temperature rise resulting from press working operation or the like (or contracts with a temperature fall), the sliding surfaces 7B, 8B of the semi-cylindrical slide members 7, 8 provided on the slide 2 will deform to extend outwardly parallel to the sliding surfaces 5A, 6A of the gibs 5, 6. Therefore, even in a situation in which the temperature of the slide 2 tends to become relatively high, surface contact of the sliding surfaces is maintained, and abrasion and adhesion caused by heat fusion due to friction can be prevented from occurring, and reciprocating motion of the slide 2 can be guided with low friction with a high degree of precision.

Although in the above described embodiment the semi-cylindrical slide members 7, 8 and the slide member holders 9, 10 are retained on the slide 2, the present invention is not limited to this particular structure. As an alternative design, the semi-cylindrical slide members 7, 8 and the slide member holders 9, 10 may be provided on the gibs 5, 6, and flat sliding surfaces extending along the direction of up and down movement may be provided on the slide 2.

Although the above description has been directed to a case in which the semi-cylindrical slide members 7, 8 and the slide member holders 9, 10 respectively having the identical structures are arranged one above the other along the direction of up and down movement of the slide 2, semi-cylindrical slide members and the slide member holders having different structures may be used in combination when appropriate. For example, the structure shown in FIG. 2 and the structure shown in FIG. 5 may be used in combination respectively as the upper structure and the lower structure with respect to the direction of up and down movement of the slide 2.

The flat portion (or sliding surface) 7B (8B) is not necessarily be a surface formed by cutting a cylinder by a plane substantially parallel to the center axis of the cylinder, but it may be a surface formed by cutting a cylinder by a plane that intersects with the center axis of the cylinder. In other words, the flat portion (or sliding surface) 7B (8B) may be formed in such a way that the projection of the flat portion (or sliding surface) 7B (8B) on the center axis of the cylinder (as the flat portion (or sliding surface) 7B (8B) is projected in the direction perpendicular to the center axis of the cylinder onto this axis) has a predetermined length (so that surface contact of the sliding surfaces is achieved within an adjustment range that meets requirements).

It should be understood that other various modifications can be made without departing from the essence of the present invention.

INDUSTRIAL APPLICABILITY

According to the slide guide apparatus of a press machine according to the present invention, the surface pressure on the sliding surface between the slide and the guide member or the main body of the press machine is made uniform by reliable surface contact, though the apparatus has a simple structure that can be produced easily. Thus, abrasion and adhesion caused by heat fusion due to friction can be prevented from occurring, and reciprocating motion of the slide can be guided advantageously with low friction with a high degree of precision.

What is claimed is:

1. A slide guide apparatus of a press machine that guides reciprocating motion of a slide of the press machine by a sliding surface provided between a guide member and the slide wherein, a slide member that is rotatable about a predetermined rotation center axis and a slide member holder that rotatably holds said slide member and is rotatable about a rotation center axis transverse to said predetermined rotation center axis are provided between the guide member and the slide, and a flat portion of said slide member is adapted to function as said sliding surface.

2. A slide guide apparatus of a press machine according to claim 1, wherein said slide member and said slide member holder are retained on said slide.

3. A slide guide apparatus of a press machine according to claim 1, wherein the direction of said predetermined rotation center axis is arranged to be substantially parallel to the direction of reciprocating motion of said slide.

4. A slide guide apparatus of a press machine according to claim 1, wherein said slide has a substantially rectangular shape in a plane substantially perpendicular to the direction of reciprocating motion, and slide members similar to said slide member and slide member holders similar to said slide member holder are provided at or in the vicinity of four corners of said slide.

5. A slide guide apparatus of a press machine according to claim 4, wherein adjacent sliding surfaces are arranged in such a way that if the adjacent sliding surface are extended toward inside of said slide, the extensions thereof intersect with each other as seen from the direction of reciprocating motion.

6. A slide guide apparatus of a press machine according to claim 4, wherein adjacent sliding surfaces are arranged in such a way that if the adjacent sliding surface are extended toward outside of said slide, the extensions thereof intersect with each other as seen from the direction of reciprocating motion.

7. A slide guide apparatus of a press machine according to claim 1, wherein said slide member has a cylindrical portion having a cylindrical outer surface provided about the predetermined rotation center axis and the flat portion extending in the direction of said predetermined rotation center axis, and said slide member holder has a cylindrical portion having a cylindrical outer surface provided about the rotation center axis transverse to said predetermined rotation center axis and rotatably receives the cylindrical portion of said slide member in a recess.

8. A slide guide apparatus of a press machine according to claim 7, wherein said slide member and said slide member holder are retained on said slide.

9. A slide guide apparatus of a press machine according to claim 7, wherein the direction of said predetermined rotation center axis is arranged to be substantially parallel to the direction of reciprocating motion of said slide.

10. A slide guide apparatus of a press machine according to claim 7, wherein said slide has a substantially rectangular shape in a plane substantially perpendicular to the direction of reciprocating motion, and slide members similar to said slide member and slide member holders similar to said slide member holder are provided at or in the vicinity of four corners of said slide.

11. A slide guide apparatus of a press machine according to claim 10, wherein adjacent sliding surfaces are arranged in such a way that if the adjacent sliding surface are extended toward inside of said slide, the extensions thereof intersect with each other as seen from the direction of reciprocating motion.

12. A slide guide apparatus of a press machine according to claim 10, wherein adjacent sliding surfaces are arranged in such a way that if the adjacent sliding surface are extended toward outside of said slide, the extensions thereof intersect with each other as seen from the direction of reciprocating motion.

13. A slide guide apparatus of a press machine according to claim 7, wherein the cylindrical portion of said slide member is provided with a stepped portion stepped with respect to a radial direction, the recess of said slide member holder is provided with a stepped portion engaging with said stepped portion of said slide member, and positioning of said slide member with respect to the direction of said predetermined rotation center axis relative to said slide member holder is achieved by means of engagement of the stepped portions.

14. A slide guide apparatus of a press machine according to claim 13, wherein the direction of said predetermined rotation center axis is arranged to be substantially parallel to the direction of reciprocating motion of said slide.

15. A slide guide apparatus of a press machine according to claim 13, wherein said slide has a substantially rectangular shape in a plane substantially perpendicular to the direction of reciprocating motion, and slide members similar to said slide member and slide member holders similar to said slide member holder are provided at or in the vicinity of four corners of said slide.

16. A slide guide apparatus of a press machine according to claim 15, wherein adjacent sliding surfaces are arranged in such a way that if the adjacent sliding surface are extended toward inside of said slide, the extensions thereof intersect with each other as seen from the direction of reciprocating motion.

17. A slide guide apparatus of a press machine according to claim 15, wherein adjacent sliding surfaces are arranged in such a way that if the adjacent sliding surface are extended toward outside of said slide, the extensions thereof intersect with each other as seen from the direction of reciprocating motion.

* * * * *